(12) United States Patent
Owada et al.

(10) Patent No.: US 10,338,723 B2
(45) Date of Patent: Jul. 2, 2019

(54) TOUCHPAD AND METHOD OF MAKING SAME

(71) Applicant: ALPS ALPINE CO., LTD., Tokyo (JP)

(72) Inventors: Ko Owada, Miyagi (JP); Yuki Oishi, Miyagi (JP); Masahiro Takata, Miyagi (JP); Teruyasu Fukuyama, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 15/889,360

(22) Filed: Feb. 6, 2018

(65) Prior Publication Data

US 2018/0232091 A1 Aug. 16, 2018

(30) Foreign Application Priority Data

Feb. 10, 2017 (JP) .................................. 2017-023456

(51) Int. Cl.
*G06F 3/041* (2006.01)
*G06K 9/00* (2006.01)

(52) U.S. Cl.
CPC ....... *G06F 3/0414* (2013.01); *G06K 9/00013* (2013.01); *G06K 9/00087* (2013.01)

(58) Field of Classification Search
None
See application file for complete search history.

(56) References Cited

U.S. PATENT DOCUMENTS

| 9,772,730 B2 | 9/2017 | Lee et al. | |
| 2013/0307818 A1* | 11/2013 | Pope | G06F 3/044 345/174 |
| 2016/0224178 A1* | 8/2016 | Yang | G06K 9/00013 |

FOREIGN PATENT DOCUMENTS

JP 2016-006648 1/2016

* cited by examiner

*Primary Examiner* — Nicholas J Lee
(74) *Attorney, Agent, or Firm* — IPUSA, PLLC

(57) ABSTRACT

A touchpad includes an operating plate having an operating surface on which an inputting operation is performed, an added feature part attached to a first surface of the operating plate opposite from the operating surface, a sensing unit disposed to face toward at least a portion of the first surface, the portion being at least a part of an area of the first surface other than an area to which the added feature part is attached, a holding member disposed at a predetermined distance apart from a first face of the added feature part, the first face of the added feature part being opposite from a second face thereof facing toward the operating plate, and a support member situated between, and in contact with, the added feature part and the holding member, wherein the support member has a lower Young's modulus than the added feature part and the holding member.

15 Claims, 8 Drawing Sheets

FIG.1
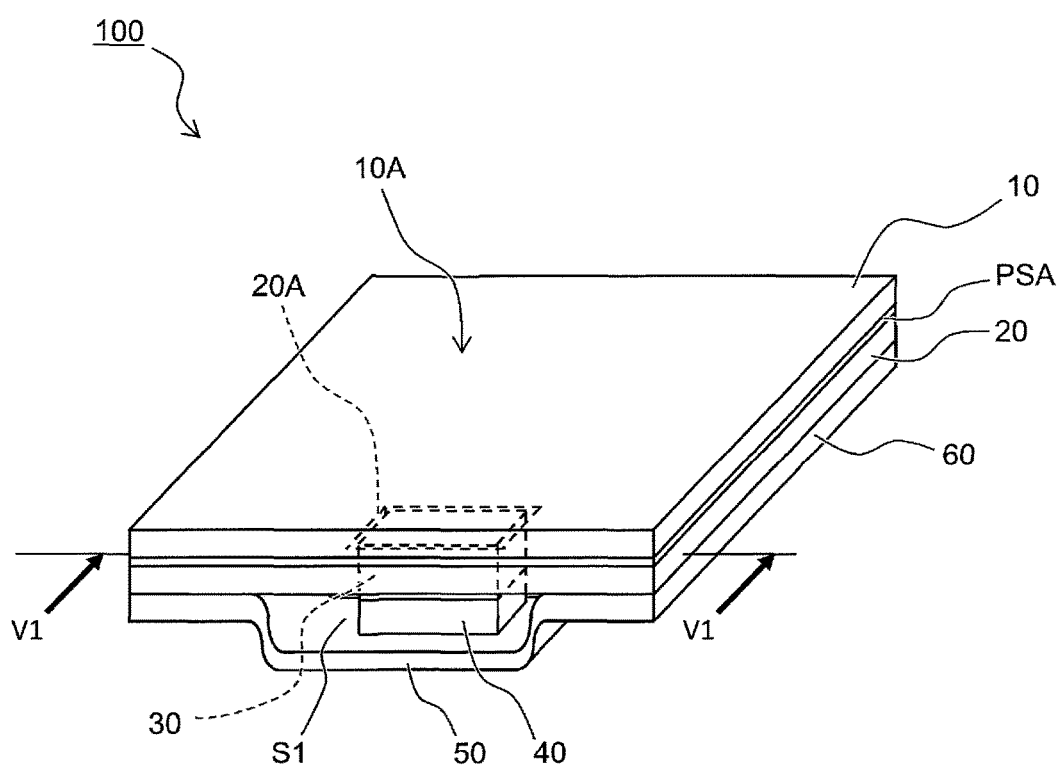
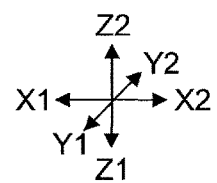

TOUCHPAD AND METHOD OF MAKING SAME

BACKGROUND OF THE INVENTION

1. Field of the Invention

The disclosures herein relate to a touchpad and a method of making the same.

2. Description of the Related Art

Electronic devices having a fingerprint authentication function have been used more and more. The position at which a device for fingerprint authentication is disposed varies from electronic device to electronic device. For example, some touchscreen panels have a substrate, a touch sensing structure disposed on the substrate, and a fingerprint authentication module mounted on the substrate, such that the touch sensing structure and the fingerprint authentication module are disposed on the same side of the substrate (see Patent Document 1, for example). Such touchscreen panels are structured such that the fingerprint authentication module is mounted to the substrate via an adhesive layer.

As in the touchscreen panel disclosed in Patent Document 1, a device for fingerprint authentication (i.e., the fingerprint authentication module in the case of Patent Document 1) may be made to adhere to a member (i.e., the substrate in the case of Patent Document 1) having an operating surface on which an input operation is performed, thereby helping to simplify the entire structure, with expectations for improvements in design freedom and productivity.

From the viewpoint of enhancing the position detection function of a touchscreen panel, the thickness of a member (which will hereinafter be referred to as a "operating plate") having an operating surface on which an inputting operation is performed may be decreased. Such a decrease made in the structure described above may increase the risk of having a problem as follows.

A decrease in the thickness of an operating plate makes the operating plate more likely to be warped when pressed by a finger for the purpose of fingerprint authentication. This warpage serves as a peel force which causes the fingerprint authentication device glued to the operating plate to break off partially, resulting in a failure to detect a fingerprint. In this manner, decreasing the thickness of an operating plate in a touchscreen panel with added features such as a fingerprint authentication device may cause the added features to fail to function properly due to the warpage of the operating plate during use.

It may be desired to provide a touchpad having a structure in which an added feature part attached to the operating plate is unlikely to break off even when the thickness of the operating plate is decreased, and may also be desired to provide a method of making such a touchpad.

RELATED-ART DOCUMENTS

Patent Document

[Patent Document 1] Japanese Patent Application Publication No. 2016-6648

SUMMARY OF THE INVENTION

According to an embodiment, a touchpad includes an operating plate having an operating surface on which an inputting operation is performed, an added feature part attached to a first surface of the operating plate opposite from the operating surface, a sensing unit disposed to face toward at least a portion of the first surface, the portion being at least a part of an area of the first surface other than an area to which the added feature part is attached, a holding member disposed at a predetermined distance apart from a first face of the added feature part, the first face of the added feature part being opposite from a second face thereof facing toward the operating plate, and a support member situated between, and in contact with, the added feature part and the holding member, wherein the support member has a lower Young's modulus than the added feature part and the holding member.

According to an embodiment, a method of making the above-noted touchpad includes placing, in a placement step, a first member and the holding member at a spaced interval equal to a thickness of the support member, the first member including the operating plate and the added feature part attached to the operating plate, supplying, in a supply step, the resin-based material in a fluid state through the penetrating hole of the holding member to the first face of the added feature part opposite from the second face thereof facing toward the operating plate, and reducing, in an adhering step, fluidity of the supplied resin-based material to make the support member attached to both the added feature part and the holding member.

According to at least one embodiment, a touchpad has a structure in which an added feature part attached to the operating plate is unlikely to break off even when the thickness of the operating plate is decreased, and a method of making such a touchpad is provided.

BRIEF DESCRIPTION OF THE DRAWINGS

Other objects and further features of the present invention will be apparent from the following detailed description when read in conjunction with the accompanying drawings in which:

FIG. 1 is a drawing schematically illustrating the entire structure of a touchpad according to a first embodiment;

DESCRIPTION OF THE PREFERRED EMBODIMENTS

In the following, embodiments will be described by referring to the accompanying drawings.

Figure 2:
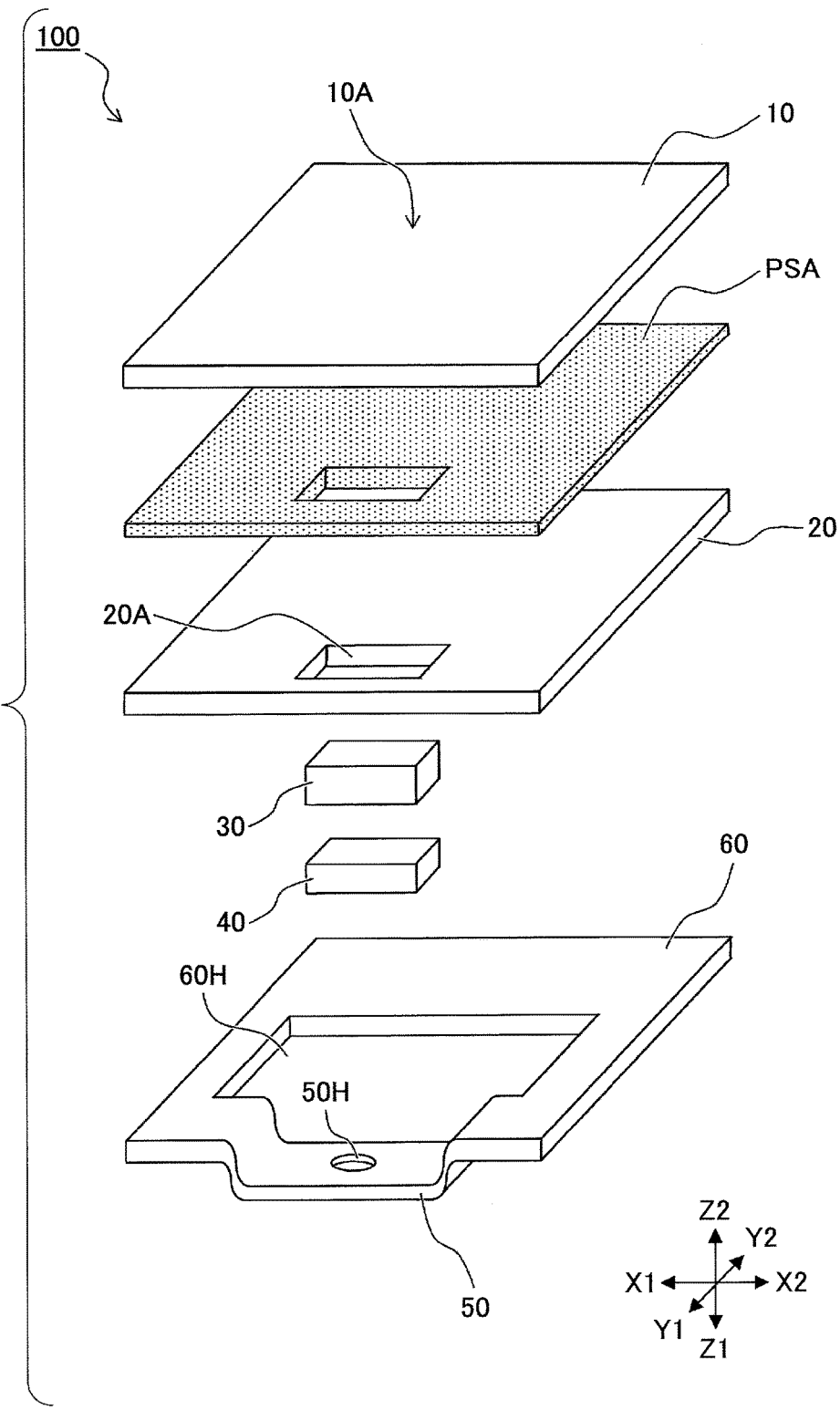
FIG. 2 is an exploded view of the touchpad illustrated in FIG. 1 as exploded in the Z1-Z2 direction to show the arrangement of major components.
Figure 3A:
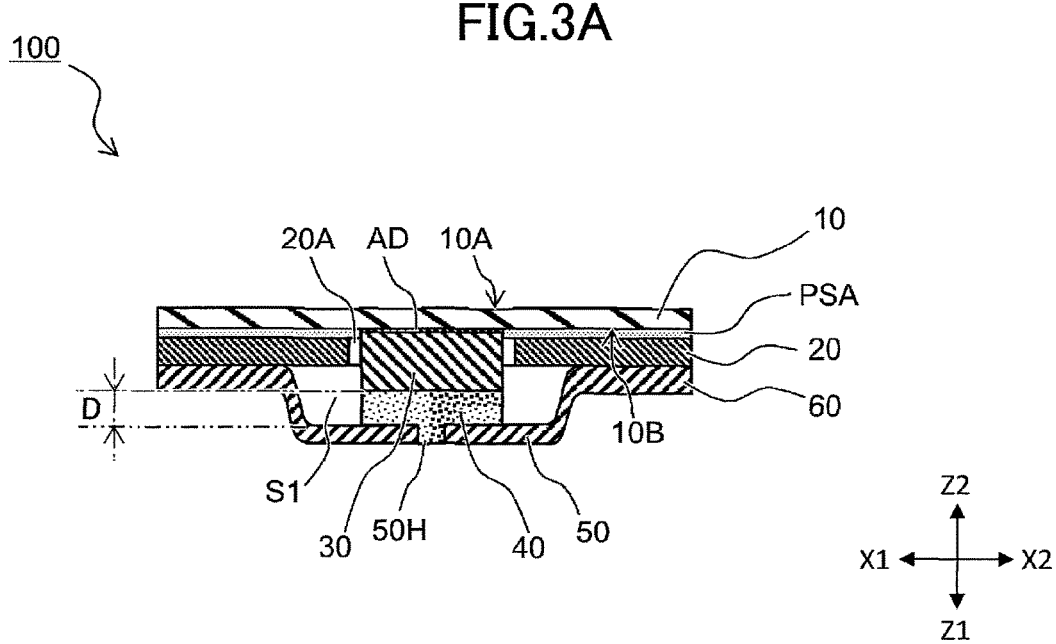
FIGS. 3A and 3B are a cross-sectional view taken along the line V1-V1 in FIG. 1 and a plan view of the touchpad illustrated in FIG. 1 as viewed in the Z1-Z2 direction, respectively.
Figure 3B:
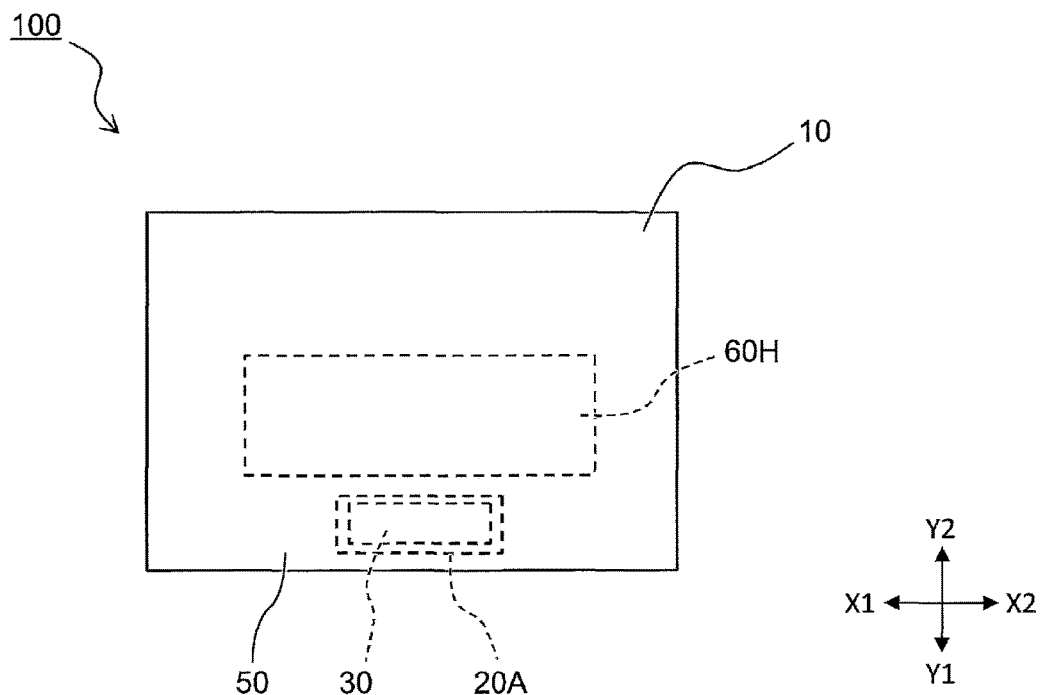

FIG. 1 is a drawing schematically illustrating the entire structure of a touchpad according to a first embodiment. FIG. 2 is an exploded view of the touchpad illustrated in FIG. 1 as exploded in the Z1-Z2 direction to show the arrangement of major components. FIG. 3A is a cross-sectional view taken along the line V1-V1 in FIG. 1. FIG. 3B is a plan view of the touchpad illustrated in FIG. 1 as viewed in the Z1-Z2 direction.

As illustrated in FIG. 1 through FIGS. 3A and 3B, a touchpad 100 according to the first embodiment includes an operating plate 10 having an operating surface 10A on which an inputting operation is performed. The operating plate 10 is not limited to a particular material. The material, however, is required to have proper strength and flexibility. Examples of such a material include an inorganic material such as glass and an organic materials such as polycarbonate or polyester.

The touchpad 100 includes a fingerprint authentication device 30 that is disposed at part of a first surface 10B of the operating plate 10 opposite from the operating surface 10A. The fingerprint authentication device 30 is one type of an added feature part of the touchpad 100. The fingerprint authentication device 30 is attached to the first surface 10B via an adhesive layer AD. In the present embodiment, the adhesive layer AD is obtained by solidifying a silicon-based adhesive agent.

The touchpad 100 includes a sensing unit 20 that is disposed opposite at least a portion of the other area of the first surface 10B than the area to which the fingerprint authentication device 30 serving as an added feature part is attached. The sensing unit 20 is secured at its position relative to the first surface 10B by a pressure-sensitive adhesive layer PSA. In the present embodiment, the pressure-sensitive adhesive layer PSA is made of an acrylic-based pressure-sensitive adhesive. The sensing unit 20 has an opening 20A penetrating therethrough in the normal direction (i.e., Z1-Z2 direction) of the operating surface 10A. The fingerprint authentication device 30 is situated in the opening 20A. The fingerprint authentication device 30 is not limited to a particular specific structure. As an example, the fingerprint authentication device 30 may have a structure in which capacitive-type sensors are formed at high density on a semiconductor substrate, e.g., with detection electrodes being disposed at intervals of a few tens of micrometers.

The touchpad 100 includes a holding member 50 that is disposed at a distance D apart from the face of the fingerprint authentication device 30 opposite from the other face thereof that faces toward the operating plate 10 The touchpad 100 is structured such that the holding member 50 is continuous with a support plate 60 disposed on the face of the sensing unit 20 opposite from the other face thereof facing toward the operating plate 10. Specifically, the holding member 50 is regarded as a portion of the support plate 60 made of a metal material such as an aluminum material such that the portion is made by a stamping process to project away from the position of the sensing unit 20. Namely, the holding member 50 is also made of a metal material. When viewed in the normal direction of the operating surface 10A (i.e., in the Z1-Z2 direction), i.e., when viewed in a plan view, the holding member 50 and the fingerprint authentication device 30 are arranged such that the holding member 50 encompasses the fingerprint authentication device 30. The holding member 50 of the touchpad 100 also encompasses the opening 20A in the plan view. The holding member 50 has a penetrating hole 50H penetrating therethrough from the surface thereof facing the fingerprint authentication device 30 and the opposite surface thereof.

The touchpad 100 has a support member 40 situated between, and in direct contact with, the holding member 50 and the fingerprint authentication device 30 serving as an added feature part. The support member 40 is made of a material having a lower Young's modulus than the fingerprint authentication device 30 and the holding member 50. An example of such a material includes a resin-based material whose fluidity can be changed. Examples of such a resin-based material include a curable resin-based material such as a silicone-based adhesive, an epoxy-based adhesive, an acrylic-based adhesive, or a bismaleimide-based adhesive and a thermoplastic resin-based material such as polyethylene, polypropylene, or polyester. The resin-based material may include a filler. Examples of the filler include an inorganic filler such as silica and an organic filler such as polytetrafluoroethylene (PTFE).

The support member 40 made of a resin-based material as described above is situated to fill a gap between the fingerprint authentication device 30 and the holding member 50. Such an arrangement of the support member 40 ensures that the holding member 50 holds the fingerprint authentication device 30 in a more stable manner.

The support member 40 is preferably made of a resin-based material whose fluidity is reduced after the material having a sufficient fluidity is poured into the gap between the fingerprint authentication device 30 and the holding member 50 through the penetrating hole 50H. With the use of such a material for the support member 40, stress is less likely to be applied to added feature parts such as the fingerprint authentication device 30 when forming the support member 40.

At least a part of the side faces of the support member 40 (i.e., the faces extending in the Z1-Z2 direction) is exposed to a space S1 formed between the sensing unit 20 and the holding member 50. With the side faces of the support member 40 being exposed to the space S1, volume contraction that may occur as a result of reduction in the fluidity of a resin-based material is less likely to exert influence in the Z1-Z2 direction. Because of this, the state of bonding between the fingerprint authentication device 30 and the first surface 10B is less likely to change at the time of forming the support member 40. The space S1 is defined by the sensing unit 20 and the holding member 50 in the Z1-Z2 direction, and is defined by the portions continuous between the holding member 50 and the support plate 60 in the X1-X2 direction, while being open in the Y1-Y2 direction. The fingerprint authentication device 30 and the support member 40 are placed in the space S1.

Any arrangement may be employed to fix the position of the support plate 60 relative to the sensing unit 20. Fixing may be done by an adhesive, or by screws or the like. Fixing the sensing unit 20 with respect to the support plate 60 serves to set relative positions between the holding member 50 continuous with the support plate 60 and the operating plate 10 supported by the sensing unit 20 via the pressure-sensitive adhesive layer PSA.

Provision of a support-plate opening 60H formed through the support plate 60 at the center thereof makes it easier to pull out wires extending from the sensing unit 20 to the outside of the touchpad 100.

Figure 4:
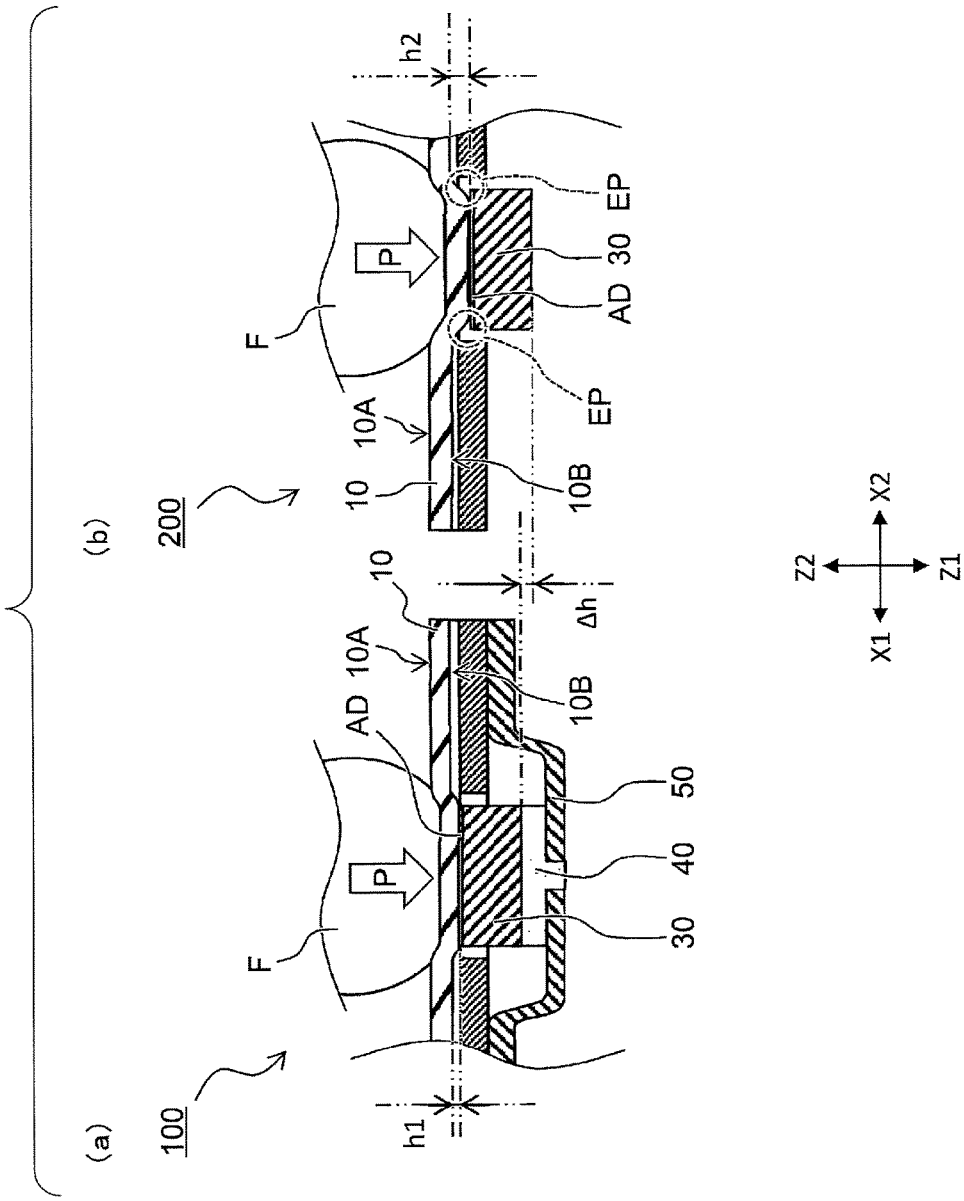
FIG. 4 is a drawing illustrating the features of the touchpad according to the first embodiment, wherein part (a) illustrates the way in which the touchpad of the first embodiment is pressed, and part (b) illustrates the way in which a related-art touchpad is pressed.

FIG. 4 is a drawing illustrating the features of the touchpad according to the present embodiment. Part (a) of FIG. 4 illustrates the way in which the touchpad of the present embodiment is pressed, and part (b) of FIG. 4 illustrates the way in which a related-art touchpad is pressed.

In the case of the touchpad 100 of the present embodiment, pressing an area of the operating surface 10A, on the back face of which the fingerprint authentication device 30 serving as an added feature part is mounted, causes an urging force to be transmitted to the fingerprint authentication device 30. Part (a) of FIG. 4 depicts the way in which a finger F applies pressure P to the fingerprint authentication device 30 via the operating plate 10 toward the Z1 side in the Z1-Z2 direction. The pressure P applied to the fingerprint authentication device 30 is transmitted to the support member 40 and to the holding member 50.

As was previously described, the support member 40 has a lower Young's modulus than the fingerprint authentication device 30 and the holding member 50. Because of this, the support member 40 more readily deforms upon receiving the pressure P than the fingerprint authentication device 30 and the holding member 50. The support member 40 is compressed as a result, so that the fingerprint authentication device 30 is displaced by a distance h1 in the direction in which the pressure is applied (i.e., toward the Z1 side in the Z1-Z2 direction). While the fingerprint authentication device 30 is displaced toward the Z1 side in the Z1-Z2 direction, the likelihood of having an excessive amount of displacement of the fingerprint authentication device 30 is reduced because the holding member 50 with high stiffness is situated on the Z1 side of the touchpad 100 in the Z1-Z2 direction. Consequently, the displacement of the fingerprint authentication device 30 caused by the application of pressure is maintained within a proper range, thereby making it less likely for the fingerprint authentication device 30 to break off from the first surface 10B.

In contrast, a related-art touchpad 200 does not have the support member 40 and the holding member 50 on the Z1 side of the fingerprint authentication device 30 in the Z1-Z2 direction, as can be seen in part (b) of FIG. 4. When the finger F applies pressure P to the fingerprint authentication device 30 via the operating plate 10 toward the Z1 side in the Z1-Z2 direction, the fingerprint authentication device 30 receiving the pressure P is displaced toward the Z1 side in the Z1-Z2 direction while being supported only by the adhesive force of the adhesive layer AD situated between the operating plate 10 and the fingerprint authentication device 30. The edges of the fingerprint authentication device 30 thus receive forces acting to separate the fingerprint authentication device 30 from the operating plate 10. In part (b) of FIG. 4, opposite edges EP in the X1-X2 direction are enclosed in dotted-line circles. As a result, at least one of disengagement between the operating plate 10 and the adhesive layer AD, de-agglomeration of the adhesive layer AD, and disengagement between the adhesive layer AD and the fingerprint authentication device becomes likely to occur. Occurrence of these phenomena makes it difficult for the fingerprint authentication device 30 to detect the fingerprint of the finger F. It may be noted that part (b) of FIG. 4 shows the case in which the operating plate 10 breaks off from the adhesive layer AD.

In the related-art touchpad 200, application of the pressure P by the finger F brings about a displacement by a distance h2 toward the Z1 side in the Z1-Z2 direction. When this happens, the only factor that restricts the displacement is the adhesion force of the adhesive layer AD situated between the operating plate 10 and the fingerprint authentication device 30, so that a relative displacement in the Z1-Z2 direction occurs at the edges of the fingerprint authentication device 30 between the operating plate 10 and the fingerprint authentication device 30. This results in difficulties to detect a fingerprint. In contrast, the touchpad 100 of the present embodiment is structured such that a displacement of the fingerprint authentication device 30 toward the Z1 side in the Z1-Z2 direction, upon application of the pressure P by the finger F, is restricted by the support member 40 and the holding member 50 situated on the Z1 side of the fingerprint authentication device 30 in the Z1-Z2 direction. In FIG. 4, a difference in the displacement is shown as Δh.

In the touchpad 100 of the present embodiment described above, a displacement toward the Z1 side in the Z1-Z2 direction is properly restricted, so that the problem of having difficulties to detect a fingerprint at the edges of the fingerprint authentication device 30 is unlikely to occur, unlike in the case of the related-art touchpad 200.

Figure 5:
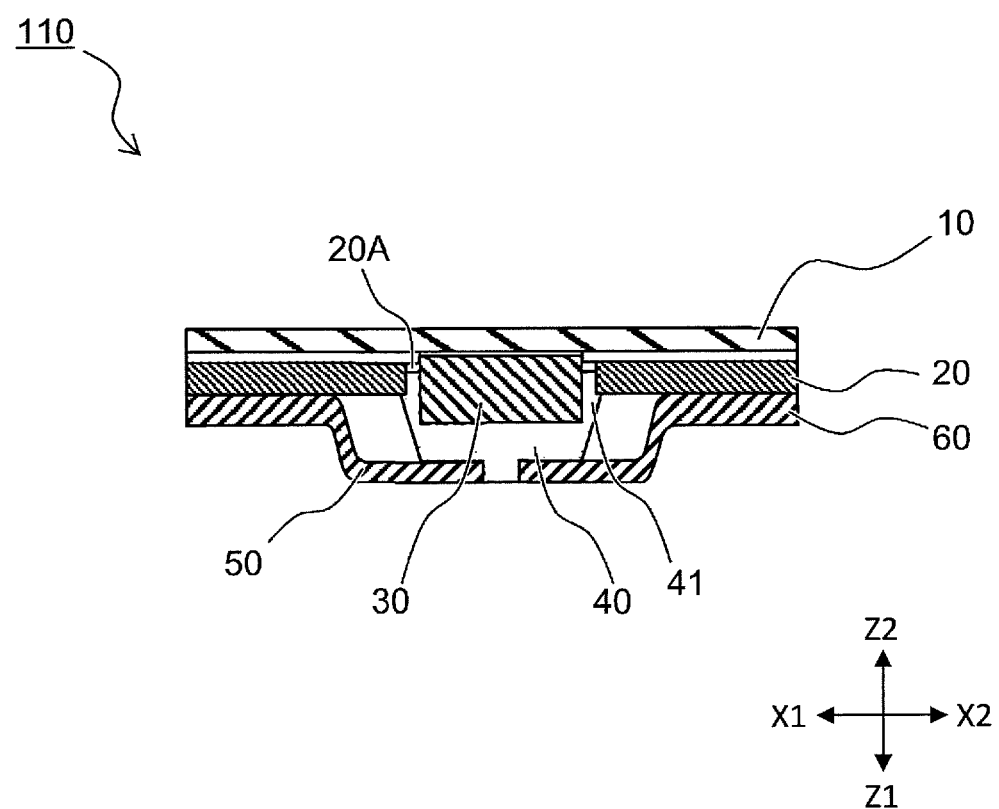
FIG. 5 is a cross-sectional view of the structure of a touchpad according to a second embodiment.
Figure 6:
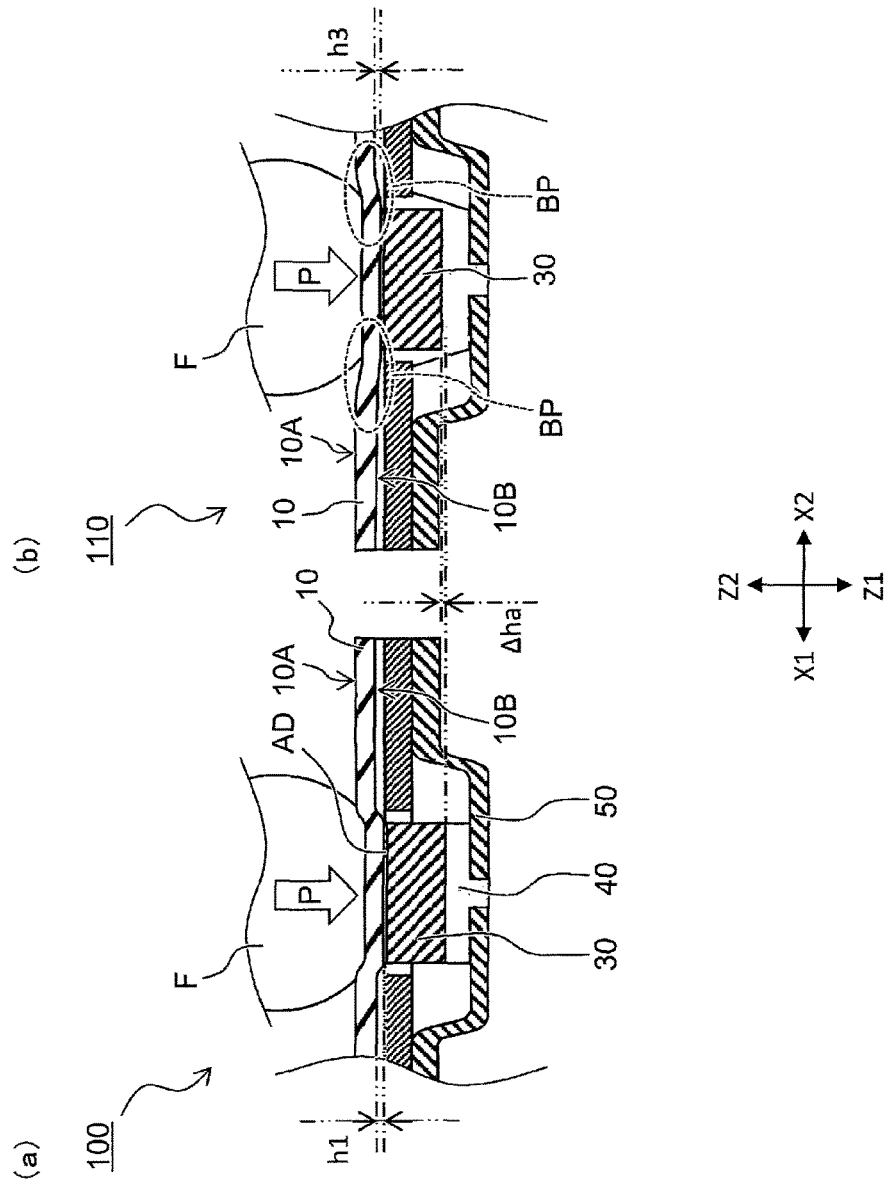
FIG. 6 is a drawing illustrating the features of the touchpad according to the second embodiment, wherein part (a) illustrates the way in which the touchpad of the first embodiment is pressed, and part (b) illustrates the way in which the touchpad of the second embodiment is pressed.

In the following, the configuration of a touchpad according to a second embodiment will be described by referring to FIG. 5 and FIG. 6. FIG. 5 is a cross-sectional view of the structure of the touchpad according to the second embodiment. FIG. 6 is a drawing illustrating the features of the touchpad according to the second embodiment. Part (a) of FIG. 6 illustrates the way in which the touchpad of the first embodiment is pressed, and part (b) of FIG. 6 illustrates the way in which the touchpad of the second embodiment is pressed.

As is illustrated in FIG. 5, the basic configuration of a touchpad 110 according to the second embodiment is the same as the basic configuration of the touchpad 100 according to the first embodiment. Differences lie in the configuration of the support member 40. In the touchpad 110, the material forming the support member 40 extends to, and fills, at least part of gaps between the sensing unit 20 and the fingerprint authentication device 30 in the opening 20A of the sensing unit 20, thereby forming linking parts 41.

As illustrated in part (b) of FIG. 6, when a finger F applies pressure P to the fingerprint authentication device 30 via the operating plate 10 toward the Z1 side in the Z1-Z2 direction, the urging force is not only transmitted to the support member 40 and the holding member 50 situated on the Z1 side of the fingerprint authentication device 30 in the Z1-Z2 direction, but also transmitted via the linking parts 41 to the sensing unit 20 situated beside the fingerprint authentication device 30 in the X1-X2 direction. As a result, the displacement of the fingerprint authentication device 30 toward the Z1 side in the Z1-Z2 direction becomes smaller than in the case of no linking parts 41 being provided (i.e., as in the case of the touchpad 100). In FIG. 6, the displacement in the touchpad 110 is shown as h3, and is smaller by an amount Δha than the displacement in the touchpad 100.

Further, the transmission of the pressure P via the linking parts 41 to the sensing unit 20 situated around the fingerprint authentication device 30 causes the operating plate 10 in the touchpad 110 to have larger bent portions BP created by the pressure than in the case of the touchpad 100, as illustrated in dot-line circles in part (b) of FIG. 6. As a result, deformation at the bent portions BP is relatively gentle. In the touchpad 110, thus, the likelihood of having difficulties to detect a fingerprint at the edges of the fingerprint authentication device 30 is reliably reduced compared with the case of the touchpad 100.

Figure 7:
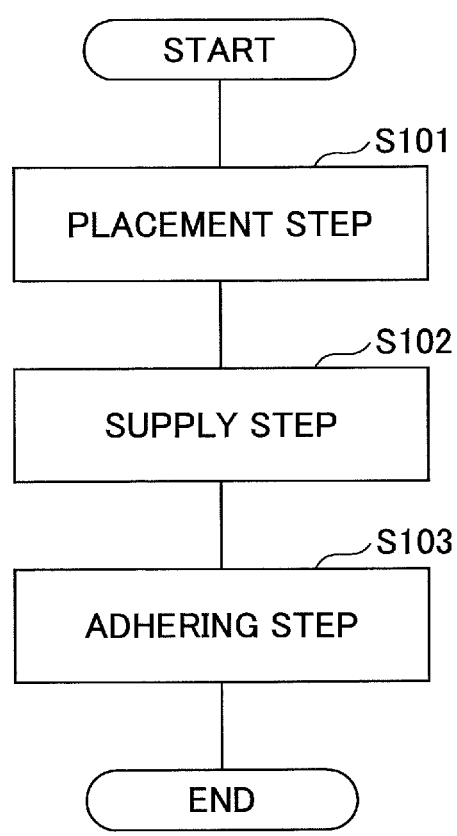
FIG. 7 is a flowchart illustrating a method of making the touchpad according to the second embodiment.
Figure 8A:
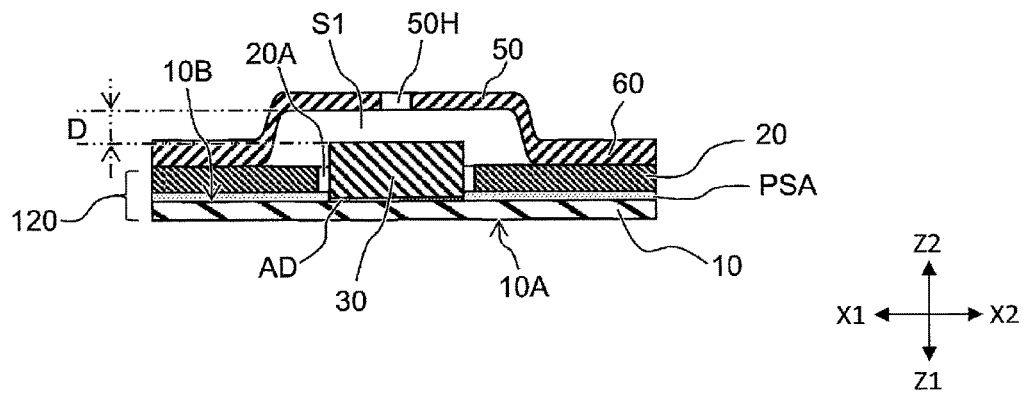
FIGS. 8A through 8C are drawings illustrating the method of making the touchpad according to the second embodiment.
Figure 8B:
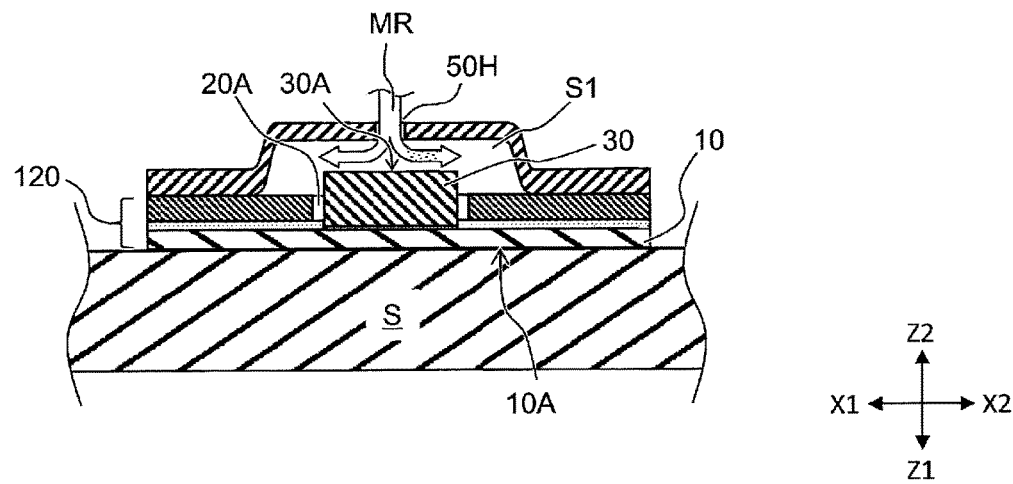
Figure 8C:
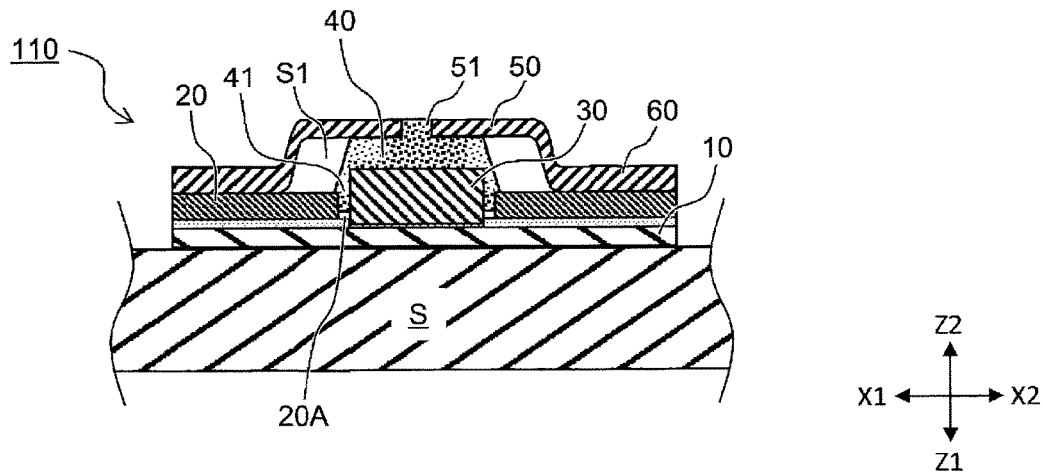

In the following, an example of a method of making the touchpad according to the second embodiment will be described by referring to FIG. 7 and FIGS. 8A through 8C. FIG. 7 is a flowchart illustrating a method of making the touchpad according to the second embodiment. FIGS. 8A through 8C are drawings illustrating the method of making the touchpad according to the second embodiment. FIG. 8A shows the state after the completion of a placement step. FIG. 8B shows the state during which a supply step is performed. FIG. 8C shows the state after the completion of an adhering step.

The method of making the touchpad 110 includes the placement step (S101), the supply step (S102), and the adhering step (S103).

In the placement step (S101), a first member 120, the support plate 60, and the holding member 50 continuous therewith are placed at a spaced interval D equal to the thickness of the support member 40. The first member 120 includes the fingerprint authentication device 30 attached to the operating plate 10 via the adhesive layer AD, and also includes the sensing unit 20 whose position is fixed by the pressure-sensitive adhesive layer PSA relative to the operating plate 10. In so doing, the fingerprint authentication device 30 and the holding member 50 are placed such that the penetrating hole 50H of the holding member 50 faces the face of the fingerprint authentication device 30 opposite from the other face thereof facing toward the first surface 10B. Namely, the space S1 is formed between the fingerprint authentication device 30 and the holding member 50.

In the supply step (S102), a resin-based material MR in a fluid state is supplied through the penetrating hole 50H of the holding member 50 to the face of the fingerprint authentication device 30 opposite from the other face thereof facing toward the operating plate 10 in the first member 120. In so doing, the resin-based material MR in a fluid state is also supplied to the gaps between the sensing unit 20 and the fingerprint authentication device 30 in the opening 20A of the sensing unit 20. The resin-based material MR in a fluid state may be the same as the material of the support member 40, or may be different therefrom. An example of the case of the same material includes a case in which the resin-based material MR is made of a thermoplastic resin, and is heated to turn into a fluid state. An example of the case of different materials include a case in which the resin-based material MR is made of a curable resin, and is placed in a fluid state before the advancement of curing reaction.

In the supply step as illustrated in FIG. 8B, the resin-based material MR is preferably supplied while the operating surface 10A of the operating plate 10 is placed in direct contact with the smooth surface of a substrate S (or the smooth surface of a mold cavity). This arrangement reduces the likelihood that the portion of the operating surface 10A whose opposite side (i.e., on the first surface) is in contact with the fingerprint authentication device 30 is made to protrude outwardly (toward the Z1 side in the Z1-Z2 direction in FIG. 8B) due to the pressure exerted by the resin-based material MR supplied to the space S1.

It may be noted that the touchpad 100 of the first embodiment may be made if the resin-based material MR in a fluid state is not supplied in this supply step to the gaps between the sensing unit 20 and the fingerprint authentication device 30 in the opening 20A of the sensing unit 20.

In the adhering step (S103), the fluidity of the resin-based material MR supplied in the supply step is reduced to make the support member 40 adhering to both the fingerprint authentication device 30 and the holding member 50. When this is done, the fluidity of the resin-based material MR also lowers at the gaps between the sensing unit 20 and the fingerprint authentication device 30, thereby creating the linking parts 41.

A method of reducing the fluidity of the resin-based material MR may be selected according to the composition of the resin-based material MR. In the case of the resin-based material MR being a thermoplastic material, the resin-based material MR may be cooled to reduce fluidity. In the case of the resin-based material MR being a curable material, heat or ionizing radiation is applied to advance the curing reaction of the resin-based material MR so as to reduce fluidity.

In the adhering step as illustrated in FIG. 8C, the fluidity of the resin-based material MR is preferably reduced while the operating surface 10A of the operating plate 10 is placed in direct contact with the smooth surface of the substrate S (or the smooth surface of a mold cavity). Reduction in the fluidity of the resin-based material MR may be associated with the occurrence of volume contraction or the like. When uneven volume contraction occurs, such a contraction may adversely affect the smoothness of the operating surface 10A of the operating plate 10. With the operating surface 10A of the operating plate 10 being in direct contact with the smooth surface of the substrate S as described above, the smoothness of the substrate S is reflected on the operating surface 10A to readily maintain the smoothness of the operating surface 10A.

When reducing the fluidity of the resin-based material MR in the adhering step, it is preferable for at least a part of the side faces of the support member 40 made of this resin-based material MR to be exposed to the space S1 formed between the sensing unit 20 and the holding member 50. Reducing the fluidity of the resin-based material MR that is partially exposed to the space S1 in this manner readily maintains the smoothness of the operating surface 10A because the volume contraction of the resin-based material MR is not likely to affect the fingerprint authentication device 30.

In the touchpad having the configuration disclosed herein, pressing the area of the operating surface whose opposite side is attached to an added feature part causes the resulting pressure to be transmitted to the added feature part and then to the support member and to the holding member. As a result, the support member having a relatively low Young's modulus most readily deforms, so that the added feature part is displaced in the direction in which the pressing force is applied. However, an excessive displacement is prevented from occurring due to the presence of the holding member having a relatively high Young's modulus. Consequently, the displacement of the added feature part caused by the application of pressure is maintained within a proper range, thereby making it less likely for the added feature part to break off from the first surface.

The sensing unit is configured to sense a position of an object coming in contact with the upper surface of the operating plate. The sensing unit may include X direction electrodes, Y direction electrodes, and detection electrodes. The sensing unit may detect the position of an object based on a change in the capacitance between the X and Y electrodes and the detection electrodes caused by the object coming in contact with the upper surface of the operating plate. The added feature part is configured to detect information other than the position of the object. Such information may relate to the fingerprint of a finger coming in contact with the upper surface of the operating plate.

In the touchpad described above, preferably, the holding member and the added feature part are arranged such that the holding member encompasses the added feature part when viewed in a normal direction of the operating surface. This arrangement reliably reduces the likelihood that the operating plate deforms to cause the first surface to break off from the edges of the added feature part.

In the touchpad described above, preferably, the support member is made of a resin-based material, and is disposed to fill a gap between the added feature part and the holding member. The use of a resin-based material for the support member readily provides a structure having a relatively low Young's modulus.

In the touchpad described above, preferably, the holding member has a penetrating hole extending from the face thereof facing toward the added feature part to the opposite face thereof, and the support member is made of the resin-based material whose fluidity is reduced after the resin-based material in a fluid state is supplied to the gap between the added feature part and the holding member through the penetrating hole. With the support member having such a configuration, stress is unlikely applied to the added feature part when forming the support member, thereby reliably further reducing the likelihood of the added feature part breaking off from the first surface.

In the touchpad described above, preferably, at least apart of the side faces of the support member is exposed to a space formed between the sensing unit and the holding member, from the viewpoint of reducing the likelihood of stress being applied to the added feature part when forming the support member.

In the touchpad described above, the sensing unit has an opening in which the added feature part attached to the operating plate is situated. With this arrangement, the added feature part is situated within the sensing unit when viewed in the normal direction of the operating surface, which may make it easier to provide the added feature while maintaining the feature of the sensing unit.

In the case of the above-noted opening being provided, preferably, the material of the support member extends to, and fills, at least a part of gaps between the sensing unit and the added feature part in the opening. When the portion of the operating surface whose opposite side (i.e., the first surface) is attached to the added feature part is pressed, the urging force applied to the added feature part is transmitted to the sensing unit via the material of the support member filling at least a part of the gaps between the sensing unit and the added feature part. Accordingly, a wider area of the operating plate is deformed in response to the pressure, thereby reducing the amount of displacement of the added feature part in the direction in which the urging force is applied.

The touchpad described above preferably includes a support plate disposed to face toward at least a part of the face of the sensing unit opposite from the other face thereof facing toward the operating plate, and the holding member is a plate member continuous with the support plate. This arrangement readily enhances the stiffness of the holding member, which readily restricts the amount of displacement of the added feature part in the direction in which the pressing force is applied.

The touchpad described above may further include a mechanical switch disposed on a portion of the face of the sensing unit opposite from the other face thereof facing toward the operating plate, wherein the mechanical switch is configured to perform a switching operation in response to warping of the operating plate. With this arrangement, a force is applied to warp the operating plate in order to operate the mechanical switch. Because the previously-noted configuration reduces the likelihood of the problem that the added feature part breaks off from the first surface due to such a warpage, a reliable operation is enabled despite the provision of an added feature such as fingerprint authentication and a switching feature embedded in the touchpad.

According to the production method previously described, the formation of the support member having a relatively low Young's modulus is enabled while properly reducing the likelihood of stress being applied to the added feature part such as a fingerprint authentication device. In the touchpad made by such a production method, the likelihood of the added feature part breaking off from the first surface is more reliably reduced.

In the production method described above, the first member may include the sensing unit, which has an opening in which the added feature part attached to the operating plate is situated. With this arrangement, preferably, the resin-based material in a fluid state is supplied also to gaps between the sensing unit and the added feature part in the opening in the supply step, and the fluidity of the supplied resin-based material is reduced in the adhering step. The material of the support member thus extends to, and fills, at least a part of the gaps between the sensing unit and the added feature part in the opening. The provision of the material of the support member extending to, and filling, at least a part of the gaps between the sensing unit and the added feature part in the opening allows part of an external force applied to the added feature part to be transmitted to the sensing unit. The amount of displacement of the added feature part caused by an external force is thus more reliably reduced.

Although the embodiments and examples of application thereof have heretofore been described, the present invention is not limited to these examples. For example, addition or removal of one or more elements or design changes may be made with respect to the embodiments or examples of application thereof, or one or more features of different embodiments may be combined as appropriate. Such modifications or variations are intended to be within the scope of the invention, without departing from the spirit of the invention.

For example, although the touchpads 100 and 110 have the fingerprint authentication device 30 as an added feature part in the present disclosures, this is not a limiting example. The advantage of providing the support member 40 and the holding member 50 is more reliably appreciated when the operating surface 10A is pressed during use, as in the case of the fingerprint authentication device 30 and a mechanical switch.

The touchpads 100 and 110 may be provided with a mechanical switch in addition to the fingerprint authentication device 30. The mechanical switch may be situated in the vicinity of the fingerprint authentication device 30, e.g., in the support-plate opening 60H. When a pressing force is applied to the operating surface 10A in order to operate the mechanical switch, the pressing force may not only deform the operating plate 10, but is also transmitted to the fingerprint authentication device 30. Even in such a case, an excessive displacement of the fingerprint authentication device 30 toward the Z1 side in the Z1-Z2 direction is unlikely to happen in the touchpads 100 and 110.

In the touchpads 100 and 110, the fingerprint authentication device 30 is attached to the first surface 10B via the adhesive layer AD. Alternatively, a pressure-sensitive adhesive layer may be used for attaching purposes in place of the adhesive layer AD, or fusion bonding may be used for the first surface 10B of the operating plate 10.

As long as a pressing force applied to the fingerprint authentication device 30 is partially transmitted via the linking parts 41 to the sensing unit 20, the gaps between the fingerprint authentication device 30 and the sensing unit 20 may remain to be void. Needless to say, it may entirely be acceptable that all the gaps between the fingerprint authentication device 30 and the sensing unit 20 are filled with the resin-based material MR.

The present application is based on and claims the benefit of priority of Japanese priority application No. 2017-023456 filed on Feb. 10, 2017, with the Japanese Patent Office, the entire contents of which are hereby incorporated by reference.

What is claimed is:

1. A touchpad, comprising:
an operating plate having an operating surface on which an in inputting operation is performed;
an added feature part attached to a first surface of the operating plate opposite from the operating surface;
a sensing unit disposed to face toward at least a portion of the first surface, the portion being at least a part of an area of the first surface other than an area thereof to which the added feature part is attached;
a holding member disposed at a predetermined distance apart from a first face of the added feature part, the first face of the added feature part being opposite from a second face thereof facing toward the operating plate; and
a support member situated between, and in contact with, the added feature part and the holding member,
wherein the support member has a lower Young's modulus than the added feature part and the holding member,
wherein the support member is made of a resin-based material, and is disposed to fill a gap between the added feature part and the holding member, and
wherein the holding member has a penetrating hole extending from a face thereof facing toward the added feature part to an opposite face thereof, and the support member is made of the resin-based material whose fluidity is reduced after the resin-based material in a fluid state is supplied to the gap between the added feature part and the holding member through the penetrating hole.

2. The touchpad as claimed in claim 1, further comprising a mechanical switch disposed on a portion of a first face of the sensing unit, the first face of the sensing unit being opposite from a second face thereof facing toward the operating plate, wherein the mechanical switch is configured to perform a switching operation in response to warping of the operating plate.

3. A method of making the touchpad of claim 1, comprising:
placing, in a placement step, a first member and the holding member at a spaced interval equal to a thickness of the support member, the first member including the operating plate and the added feature part attached to the operating plate;
supplying, in a supply step, the resin-based material in a fluid state through the penetrating hole of the holding member to the first face of the added feature part opposite from the second face thereof facing toward the operating plate; and
reducing, in an adhering step, fluidity of the supplied resin-based material to make the support member attached to both the added feature part and the holding member.

4. The method as claimed in claim 3, wherein the first member includes the sensing unit, which has an opening in which the added feature part attached to the operating plate is situated, and wherein the resin-based material in the fluid state is supplied also to gaps between the sensing unit and the added feature part in the opening in the supply step, and the fluidity of the supplied resin-based material is reduced in the adhering step such that a material constituting the support member extends to, and fills, at least a part of the gaps between the sensing unit and the added feature part in the opening.

5. The touchpad as claimed in claim 1, wherein the holding member and the added feature part are arranged such that the holding member encompasses the added feature part when viewed in a normal direction of the operating surface.

6. The touchpad as claimed in claim 1, wherein at least a part of side faces of the support member is exposed to a space formed between the sensing unit and the holding member.

7. The touchpad as claimed in claim 1, wherein the sensing unit has an opening in which the added feature part attached to the operating plate is situated.

8. The touchpad as claimed in claim 7, wherein a material constituting the support member extends to, and fills, at least a part of gaps between the sensing unit and the added feature part in the opening.

9. A touchpad, comprising:
an operating plate having an operating surface on which an inputting operation is performed;
an added feature part attached to a first surface of the operating plate opposite from the operating surface;
a sensing unit disposed to face toward at least a portion of the first surface, the portion being at least a part of an area of the first surface other than an area thereof to which the added feature part is attached;
a holding member disposed at a predetermined distance apart from a first face of the added feature part, the first face of the added feature part being opposite from a second face thereof facing toward the operating plate;
a support member situated between, and in contact with, the added feature part and the holding member; and
a support plate disposed to face toward at least a part of a first face of the sensing unit, the first face of the sensing unit being opposite from a second face thereof facing toward the operating plate, and the holding member is a plate member continuous with the support plate,
wherein the support member has a lower Young's modulus than the added feature part and the holding member.

10. The touchpad as claimed in claim 9, wherein the holding member and the added feature part are arranged such that the holding member encompasses the added feature part when viewed in a normal direction of the operating surface.

11. The touchpad as claimed in claim 9, wherein the support member is made of a resin-based material, and is disposed to fill a gap between the added feature part and the holding member.

12. The touchpad as claimed in claim 9, wherein at least a part of side faces of the support member is exposed to a space formed between the sensing unit and the holding member.

13. The touchpad as claimed in claim 9, wherein the sensing unit has an opening in which the added feature part attached to the operating plate is situated.

14. The touchpad as claimed in claim 13, wherein a material constituting the support member extends to, and fills, at least a part of gaps between the sensing unit and the added feature part in the opening.

15. The touchpad as claimed in claim 9, wherein the holding member has a penetrating hole extending from a face thereof facing toward the added feature part to an opposite face thereof, and the support member is made of the resin-based material whose fluidity is reduced after the resin-based material in a fluid state is supplied to the gap between the added feature part and the holding member through the penetrating hole.

* * * * *